United States Patent
Zimmer

(10) Patent No.: US 6,691,368 B1
(45) Date of Patent: Feb. 17, 2004

(54) MAIN PLATE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,463

(22) PCT Filed: May 26, 2000

(86) PCT No.: PCT/DE00/01722

§ 371 (c)(1), (2), (4) Date: Feb. 7, 2001

(87) PCT Pub. No.: WO00/76816

PCT Pub. Date: Dec. 21, 2000

(30) Foreign Application Priority Data

Jun. 15, 1999 (DE) .......................... 199 27 067

(51) Int. Cl.⁷ ............... B60S 1/02; B60S 1/04
(52) U.S. Cl. .................. 15/250.31; 15/250.3
(58) Field of Search ............ 15/250.3, 250.31, 15/250.27, 250.14; 296/96.15, 96.17

(56) References Cited

U.S. PATENT DOCUMENTS

| | | | |
|---|---|---|---|
| 5,339,510 A | * | 8/1994 | Roth et al. ............ 29/436 |
| 5,522,280 A | | 6/1996 | Bexten |
| 6,119,301 A | * | 9/2000 | Nakatsukasa et al. ..... 15/250.21 |

FOREIGN PATENT DOCUMENTS

| | | |
|---|---|---|
| DE | 74 34 119 | 2/1975 |
| DE | 39 19 837 A | 12/1989 |
| EP | 0 689 975 A1 | 1/1996 |
| EP | 0 852 195 A | 7/1998 |
| GB | 2 258 145 A | 2/1993 |

* cited by examiner

Primary Examiner—Terrence R. Till
(74) Attorney, Agent, or Firm—Michael J. Striker

(57) ABSTRACT

A mounting plate is provided, having a receptacle for a wiper drive and having bearing points for wiper bearings as well as fastening points for installation in a vehicle, wherein the mounting plate comprises at least two components, including one half-shell-like bent sheet-metal part connected by injection molding to a plastic body that braces the bent sheet-metal part on the inside.

14 Claims, 3 Drawing Sheets

MAIN PLATE

BACKGROUND OF THE INVENTION

The Invention is based on a mounting plate.

Wiper systems with multiple windshield wipers for motor vehicles are fastened with their wiper bearings directly or indirectly to the body of the motor vehicle via a mounting plate. The mounting plate, or a tubular mounting plate—if the wiper carrier also includes tubular hollow profiles—includes a motor mounting plate, which carries a wiper drive with a wiper motor and a gear mounted on it. A power takeoff shaft of the gear is supported in a gear dome and, as a rule via a crank and connecting rods, drives further cranks that are solidly connected to a drive shaft for each windshield wiper.

It is also possible for only the drive shaft of a windshield wiper to be driven by the wiper motor, while another windshield wiper can be connected to the first windshield wiper via a four-bar lever mechanism and has a bearing shaft. The drive shaft or bearing shaft associated with one windshield wiper is supported in a wiper bearing. The remarks hereinafter regarding a drive shaft will logically apply to a bearing shaft as well, and this will no longer be expressly mentioned.

The bearing housings are fastened to the ends of the mounting plate or integrally molded on. The mounting plate positions the wiper drive relative to the wiper bearings and essentially absorbs the driving forces generated by the wiper drive. It also determines the positioning angle of the shafts of the wiper bearings relative to the vehicle window and thus the approximate position of the wiper blade. For a good outcome of wiping, its shape stability over its service life, under the influence of extreme operating parameters such as temperatures, blockage by a load of snow, vibration, jarring, and so forth, is therefore especially important. The mounting plate furthermore serves the purpose of premounting of the driving parts and wiper bearings, to make installation on the vehicle easier.

From German Utility Model DE-GM 74 34 119, a tubular mounting plate is known that is made from a square tube, to which a plate acting as a motor mounting plate is welded. A wiper bearing is fixed to each of the ends of the square tube. To that end, the housing of the wiper bearing has attachments, which are inserted into the mounting tube and secured by screws or wobble riveting. The attachment can also be slightly conical, and the mounting tube can be retained by a press fit. Such tubular mounting plates or tubular frame systems are quite stable despite their lightweight design, but numerous assembly operations are required, and the connection points must be monitored carefully. For reasons of cost, it is a goal to produce a straight carrier tube that does not require any prebending.

From European Patent Disclosure EP 06 889 75 A1, a tubular mounting plate with a motor mounting plate is also known. This tubular mounting plate comprises two mirror-symmetrical parts, which on the side toward a tubular mounting plate have indentations in which the tubular mounting plate is embedded. The indentations each surround the tubular mounting plate over a circumferential range of approximately 180°, so that both indentations together surround the tubular mounting plate over its complete circumference. Upon installation, both parts of the motor mounting plate are placed around the tubular mounting plate and joined together, for instance mechanically, by adhesive bonding or by means of a thermal connection. This fixes the tubular mounting plate relative to the motor mounting plate in the circumferential and axial directions by positive engagement and/or by material engagement by adhesive bonding. The two parts of the motor mounting plate can be made from plastic or metal, and in one feature can also be combined into one piece.

Mounting tubes assembled from many components have numerous interfaces, whose individual tolerances add up to a total tolerance. To achieve adequate quality, close individual tolerances must be prescribed, which makes the production cost higher. Deviations from an optimal angular location and position of the wiper bearings relative to the wiper motor and/or the vehicle window can increase the driving forces and worsen the outcome of wiping. Furthermore, the numerous assembly steps increase installation costs.

Die-cast tubular mounting plates are also known, which have a load-bearing cast body with a honeycomblike reinforcing structuring. Openings for receiving a wiper drive and the wiper bearings as well as fastening points for installation in a vehicle are as a rule integrated. While the bearing points are integrally formed on and for the most part are cast in final form, the decoupling elements have to be installed separately. Compared with sheet metal, the material is expensive, and it has less strength, especially with regard to dynamic stresses.

Mounting tubes of plastic have a small number of components. The bearing points can be integrally formed in the course of production and partly injection molded in complete form. The material, however, in general has low strength and in particular inadequate shape stability, so that the settings can vary sharply under load. Furthermore, plastics have an unfavorable aging and temperature behavior. They shrink, swell, and become brittle over the course of time, and their strength properties change, especially under extreme ambient conditions. To achieve greater strength of the mounting plate, the plastic must be reinforced with fibrous materials, such as glass fibers or carbon fibers. Fiber-reinforced plastics are expensive to produce, since they require special production methods. In addition, at low temperatures they have a tendency to brittle fracture.

SUMMARY OF THE INVENTION

According to the invention, the mounting plate comprises at least two components, and one half-shell-like bent sheet-metal part is connected by injection molding to a plastic body that braces the bent sheet-metal part on the inside. A receptacle for a wiper drive and bearing points for wiper bearings as well as fastening points for installation in a vehicle are expediently integrated, so that they can all be produced in the same production process. As a result, low tolerances with regard to the position and angular location can be adhered to.

The bent sheet-metal part, because it is in the form of a half shell, assures durable shape stability and strength, even under extremely high dynamic bending stress, and the plastic body together with the bent sheet-metal part assures good torsional strength. Even during the injection molding of the plastic body, the bent sheet-metal part largely prevents shrinkage and vanishing of the plastic material upon cooling down, so that high precision with regard to the bearing spacings and the axial angles are attained. Since the bent sheet-metal part does not age or swell, the dimensions and strength values are preserved over the service life. By means of the mounting plate, the positioning angle of the bearing shafts relative to the vehicle window is defined. High shape stability of the mounting plate therefore assures a precise setting of the angular locations and assures a wiper outcome that remains constantly good.

The connection of a thin-walled bent sheet-metal part with plastic is of lightweight construction and nevertheless has bending strength and torsional strength, so that the mounting plate has low weight. As a rule, plastic that is not fiber-reinforced suffices for the plastic body, but plastic that is reinforced with glass fibers or carbon fibers can also be employed. Non-fiber-reinforced plastic has the advantage that it is easier to process, remains relatively elastic at low temperatures, and does not have a tendency to brittle fracture. The plastic body itself can be embodied in lightweight form by being provided with ribs in some parts or embodying it as a hollow profile. The tall cross section, while using little material and being low in weight, assures good torsional strength of the mounting plate. Beads in the bent sheet-metal part can also be omitted, since the bent sheet-metal part already has good bending strength because of its being reshaped into a U-shaped, half-shell-shaped profile. The plastic body is expediently disposed predominantly on the side of the mounting plate that is subjected to pressure in the control situation, while the bent sheet-metal part with a markedly greater tensile strength is located predominantly in the region of the tensile forces. Since the high tensile strength of the bent sheet-metal part is combined with the low weight of the plastic body, overall a small structural volume and low weight are achieved along with high shape stability.

As a result of the injection molding process, the plastic body adheres by material engagement to the bent sheet-metal part. To reinforce the connection between the components and make it more durable, positive-engagement elements, perforations in the bent sheet-metal part, or eyelets of the bent sheet-metal part made into the plastic body, are expediently provided between components. The holes can be utilized during the injection molding as injection conduits for the plastic.

The plastic body can furthermore contribute to corrosion protection, especially if it covers the bent sheet-metal part over a large area from both sides or embeds it entirely. For corrosion protection, the bent sheet-metal part is also expediently made of zinc-coated steel, or aluminum or an aluminum alloy. The plastic body prevents possible contact corrosion at the fastening points.

For integrating a wiper bearing and/or a receptacle for the wiper drive and/or a fastening point, the bent sheet-metal part in the region has breaches, which are adjoined by cylindrical stubs that are expediently integrally molded on. In the injection molding of the plastic body, these stubs are extrusion coated in such a way that finished bearing points are created, which protrude past the stubs at the top and bottom. The plastic of the plastic body simultaneously serves as the bearing material. Required lubrication grooves can also be incorporated. Thus given a suitable choice of the plastic, the installation of additional bearing bushes and postmachining of the bearing points can be omitted. Good sliding and wear properties of the plastic at the same time enhance the service life and improve the noise performance.

In the same vise as the one used for the plastic extrusion coating, a second, elastic material component, with which the decoupling elements are formed, can be injected afterward or, given a suitable embodiment of the material, simultaneously. This further reduces the number of individual parts, and assembly steps otherwise required are omitted. Sources of mistakes from incorrect assembly are likewise precluded.

BRIEF DESCRIPTION OF THE DRAWING

Further advantages will become apparent from the ensuing description of the drawing. In the drawing, exemplary embodiments of the invention are shown. The drawing, description and claims include numerous characteristics in combination. One skilled in the art will expediently consider the characteristics individually as well and put them together to make appropriate further combinations.

Shown are.

DESCRIPTION OF THE PREFERRED EMBODIMENTS

Figure 1:
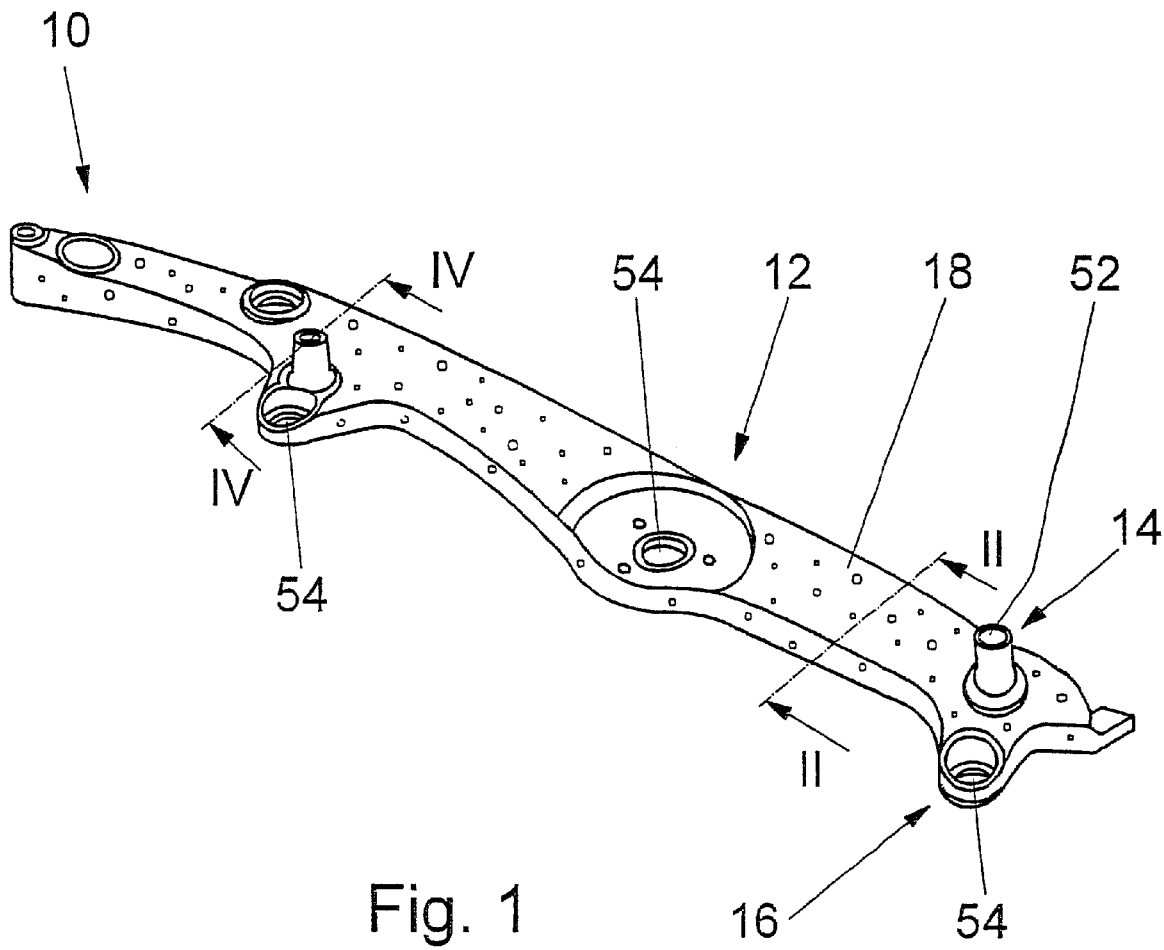
FIG. 1, a complete view of a mounting plate according to the invention.

A mounting plate 10 has a receptacle 12 for a wiper drive, at least one bearing point 14 of a wiper bearing, and at least one fastening point 16 for installation in a vehicle (FIG. 1). The mounting plate 10 has a thin-walled bent sheet-metal part 18, for instance of aluminum, an aluminum alloy, or zinc-coated steel, and a plastic body 20. The two components are joined together by material engagement and positive engagement.

Figure 2:
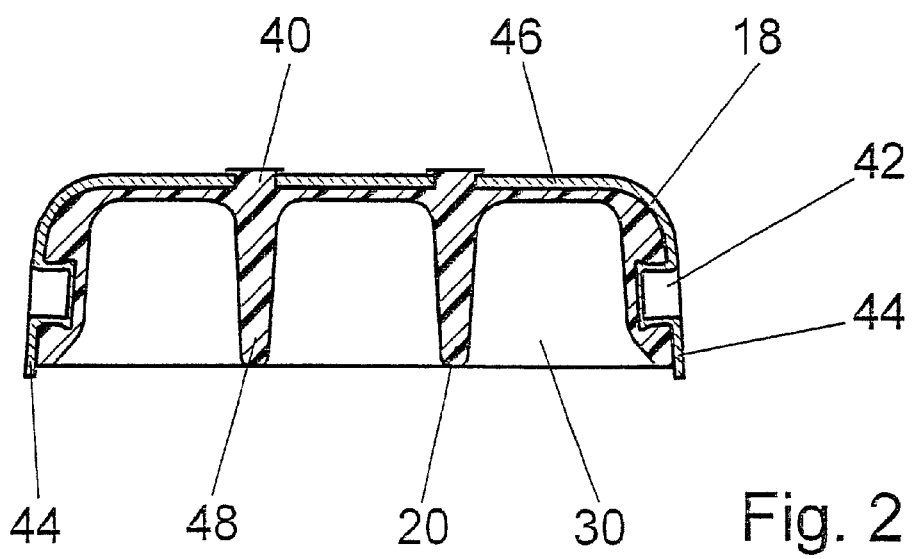
FIG. 2, a cross section taken along the line II—II of FIG. 1.

The bent sheet-metal part 18 has a half shell of u-shaped cross section (FIG. 2). The mounting plate 10 is subjected especially to bending and torsion. The U-shaped cross section of the bent sheet-metal part 18 is therefore selected such that a connecting strut 46 between the legs 44 is located in a plane in which in the typical loading situation tensile forces occur, and these forces are absorbed without significant deformation by the bent sheet-metal part 18, given its high tensile strength.

The plastic body 20 as a rule comprises non-fiber-reinforced plastic and is created by extrusion coating of the bent sheet-metal part 18. Inside the U-shaped cross section of the bent sheet-metal part 18, or in other words between the connecting strut 46 and legs 44, the plastic body 20 has ribs 48 and interstices 30, which can be either open or closed toward the bottom. A honeycomb ribbing is especially favorable, since it has approximately equal shape stability in the face of forces from different directions.

The plastic body 20, which in the bending situation absorbs primarily compression forces, substantially increases the torsional strength of the mounting plate 10, so that under both bending load and torsional load, the mounting plate 10 has high shape stability.

As a result of the injection molding, the plastic body 20 adheres by material engagement to the bent sheet-metal part 18. Furthermore, because of the shell shape of the bent sheet-metal part 18 and the breaches 52, 54 at the bearing points 14 and fastening points 16, a certain positive engagement exists. To improve the positive engagement between the two components, the bent sheet-metal part 18 has a plurality of perforations 40 at the connecting strut 46 and a plurality of eyelets 42 at the legs 44, which perforations and eyelets are extrusion-coated.

Figure 3:
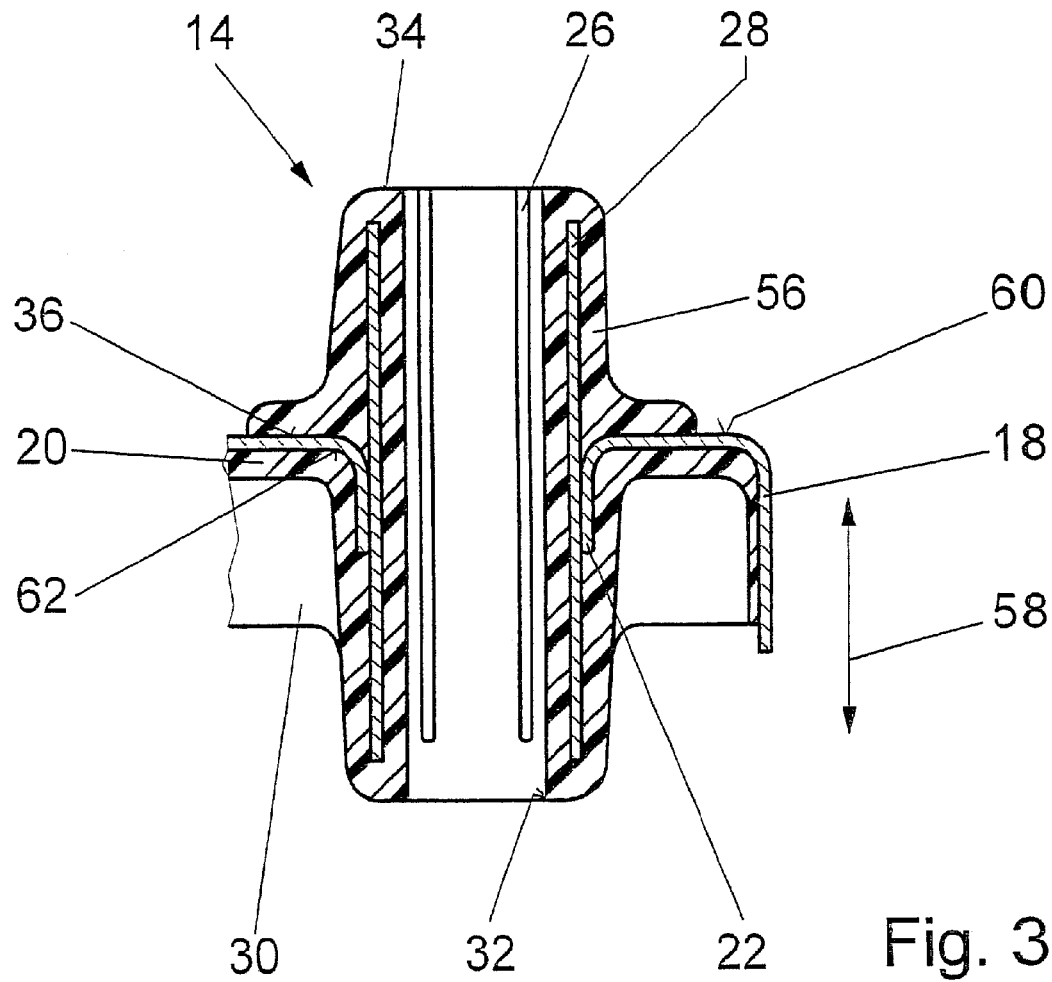
FIG. 3, a fragmentary longitudinal section through the mounting plate in the region of a bearing point.

In the region of a bearing point 14 of a wiper bearing and/or of a receptacle 12 for the wiper drive and/or of a fastening point 16, the bent sheet-metal part 18 has breaches 52, 54, onto which cylindrical stubs 22, 24 are integrally formed. FIG. 3 shows a section through one bearing point 14. The cylindrical stub 22 is extrusion coated in the course of production of the plastic body 20, in such a way that a finished bearing point 14 of a wiper bearing is created. A bearing dome 56 integrally injection molded on protrudes past the stub 22 in the direction of the arrow 58. The underside 62 of the bent sheet-metal part 18 is completely surrounded by the plastic body 20, and at the same time part of the bearing dome 56 is integrated with it. On its top 60, the bent sheet-metal part 18 conversely has a plastic extrusion coating, which forms the other part of the bearing dome 56, only in the region of the stubs 22. This part of the bearing dome 56 has an integrally formed-on support face 36 on its side toward the bent sheet-metal part 18. This enlarged bearing area braces the bearing point 14 against bending and torsional moments.

To reinforce the bearing point 14 further, a sleeve 20 press-fitted into the stub 22 is used. On the inside diameter 32 of the bearing some 56, the bearing point 14 has a plurality of axial lubrication grooves 26. However, an opening of the lubrication grooves 26 for the introduction of lubricant is present on only one face end 34 of the bearing dome 56.

Figure 4:
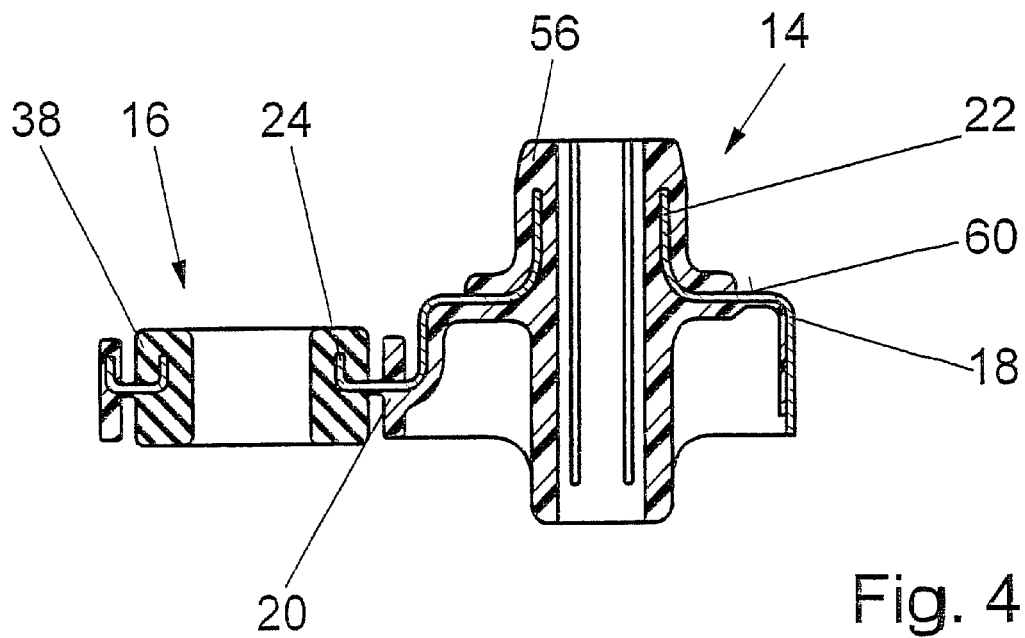
FIG. 4, a cross section taken along the line IV—IV of FIG. 1.
Figure 5:
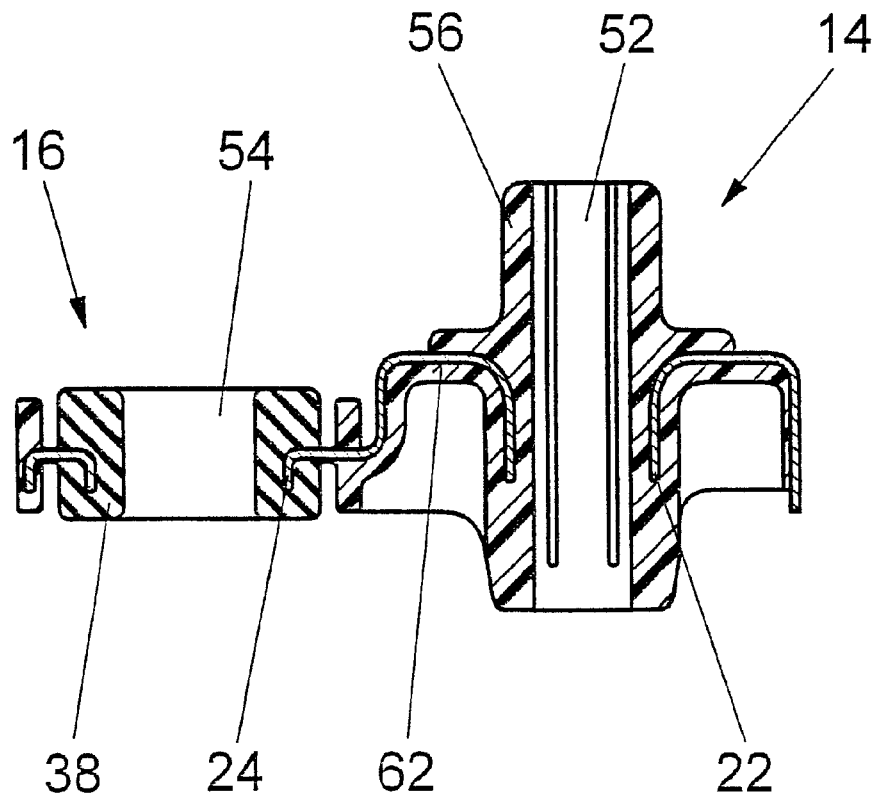
FIG. 5, a variant of FIG. 4.

The invention contemplates multiple variants of the integrally formed-on stubs 22 for the bearing points 14 and stubs 24 for the fastening points 16. In FIG. 4, the stubs 22, 24 protrude past the bent sheet-metal part 18 on the top side 60, while in FIG. 5 they are integrally formed onto the underside 62 and point in the opposite direction.

Figure 6:
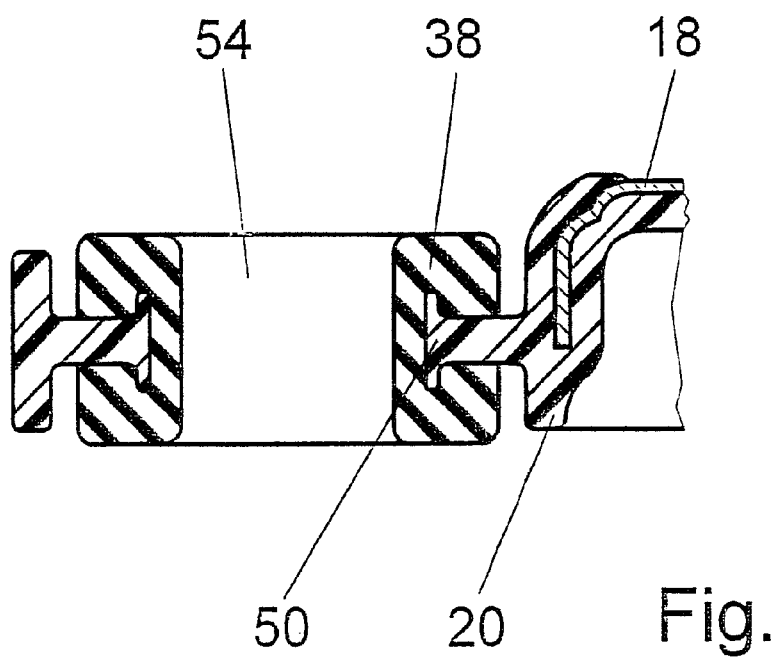
FIG. 6, a variant of FIG. 4 with a decoupling element formed integrally onto it.

In the region of the fastening points 16, the integrally formed-on stubs 24 are extrusion coated with a second, elastic material component that forms decoupling elements 38. These elements, if embodied suitably, are injection molded onto the bent sheet-metal part 18 simultaneously with the plastic extrusion coating, or afterward. In the version of FIG. 6, the fastening point is formed by the plastic body 20, which has an integrally formed-on stub 50 with a decoupling element 38 injection molded onto it.

What is claimed is:

1. A mounting plate (10), having a receptacle (12) for a wiper drive and having bearing points (14) for wiper bearings as well as fastening points (16) for installation in a vehicle, characterized in that the mounting plate (10) comprises at least two components including one half-shell-like bent sheet-metal part (18) connected by injection molding to a plastic body (20) that braces the bent sheet-metal part (18) on the inside.

2. The mounting plate (10) of claim 1, characterized in that positive-engagement elements are provided between the bent sheet-metal part (18) and the plastic body (20).

3. The mounting plate (10) of claim 1, characterized in that the bent sheet-metal part (18) comprises zinc-coated steel, aluminum or magnesium and has a U-shaped cross section.

4. The mounting plate (10) of claim 3, characterized in that a connecting strut (46) of the two legs (44) of the U-shaped cross section are located in a plane that has the greatest stresses from tensile forces.

5. The mounting plate (10) of claim 3, characterized In that the bent sheet-metal part (18), in the region of a bearing point (14) of a wiper bearing and/or of a receptacle (12) for the wiper drive and/or of a fastening point (16) has breaches (52, 54), which are adjoined by cylindrical stubs (22, 24).

6. The mounting plate (10) of claim 5, characterized in that the stubs (22, 24) are integrally formed onto the bent sheet-metal part (18).

7. The mounting plate (10) of one claim 6, characterized in that the bearing points (14) are reinforced with sleeves (28), which are press-fitted into the stubs (22) and lengthen them.

8. The mounting plate (10) of claim 1, characterized in that the bent sheet-metal part (18) has perforations (40) and/or eyelets (42), which are extrusion-coated.

9. The mounting plate (10) of one of claim 8, characterized in that the perforations (40) serve as injection channels during the injection molding.

10. The mounting plate (10) of claim 1, characterized in that the bent sheet-metal part (18) is extrusion coated from both sides over a large area in the region of the breaches (52, 54), perforations (40), and/or eyelets (42).

11. The mounting plate (10) of one claim 1, characterized in that a surrounding plastic body (20) comprises unreinforced plastic and in part has ribbing (48).

12. The mounting plate (10) of one claim 1, characterized in that the plastic body (20) has completely cast bearing points (14), which protrude past the stubs (22) of the bent sheet-metal part (18) at the top and bottom.

13. The mounting plate (10) of one claim 1, characterized in that the bearing points (14) have lubrication grooves (26).

14. The mounting plate (10) of one of claim 1, characterized in that decoupling elements (38) are integrally injection molded onto the bent sheet-metal part (18) or onto the plastic body (20) in the region of the breaches (52, 54) of the fastening points (16).

* * * * *